Patented Feb. 21, 1933

1,898,518

UNITED STATES PATENT OFFICE

FRANCIS CLARKE ATWOOD, OF NEWTON, MASSACHUSETTS

COATING MATERIAL

No Drawing.   Application filed October 25, 1928.   Serial No. 315,104.

This invention relates to a coating material and more particularly to a material for application to walls and ceilings and other surfaces to provide them with a decorative coating.

One object of the invention is to provide a novel and improved coating material which may be economically made and which possesses characteristics rendering it particularly adapted for successful use as a sizing for application to walls, ceilings and other surfaces, which adheres tenaciously to the surface to which it is applied and will not readily peel therefrom under conditions of use.

A further object of the invention is to provide a novel composition for producing a plastic coating material for application to walls, ceilings and other surfaces, which may be economically produced, may be readily converted to a plastic condition with water to be capable of immediate application to the wall or ceiling, which possesses no tendency toward peeling, and which in the preferred form possesses texturing properties.

A still further object of the invention is to provide a novel composition for producing a plastic material for application to ceilings, walls and other surfaces, in which a novel, inert ingredient is incorporated into the plastic, which imparts to the same novel and improved texturing properties, as will be described.

With these objects in view and such others as may appear, the invention consists in the different compositions hereinafter described, and particularly defined in the claims.

One feature of the present invention contemplates the provision of a novel composition which is adapted for use alone as a sizing material for application to walls, ceilings and other surfaces, and for all other purposes for which ordinary sizing material is now used, and which in addition may be used with advantage in the production of plastic compositions for surface finishing.

Prior to the present invention the successful plastic compositions which have been used as surface finishing materials, particularly for producing decorative finishes upon walls, ceilings and the like, have employed casein as a sizing or binder, together with ground mica and certain finely divided clays as the inert filling material for imparting texturing properties to the plastic composition While casein possesses the necessary property of being non-hygroscopic, it is nevertheless expensive and the use of plastic compositions utilizing it as a binder has been restricted in some instances.

I have discovered that gum arabic may be most advantageously used as a binder for sizing material for certain finishes in that in a finely divided or ground up condition it is readily water soluble and consequently a fluid size may be readily produced by agitation of the finely divided gum arabic in water, or a plastic mass may be readily produced by agitation of the finely divided gum arabic with water, together with a suitable finely divided inert filler. I have found that gum arabic possesses all of the characteristics desirable for a coating material of this character, in that it is relatively inexpensive, is non-hygroscopic, is readily soluble in cold water when in a finely divided condition, and possesses remarkable adhesive qualities which render it even more suitable than other binders for causing tenacious adherence of the coating to the wall, ceiling or other surfaces.

While for certain purposes gum arabic preferably in a finely divided state may be used alone as a size or binder and also with inert filling material in the production of plastic masses for the above described purposes, I have also discovered that the water resistance of the hardened or dry products having such a size or binder incorporated therein may be substantially increased by incorporating in such gum arabic size or binder, or in any of the compositions produced therewith an alkaline reagent in sufficient quantity to render the size or plastic slightly alkaline. In addition to its effect in increasing the water resistance of the size or plastic after the same has been applied to the surface to be coated and hardened, the presence of the alkaline reagent appears to increase the plasticity of the plastic mass and to improve the workability and texturing qualities of such plastic masses. As such an alkaline reagent I prefer to utilize an alkaline water soluble salt and I have experienced particularly good results using sodium silicate as the alkaline reagent. In practice it is preferred to utilize the commercial forms of powdered sodium silicate and when such material is incorporated into either the gum arabic size or a plastic having gum arabic as a binder, the chemical reaction between the acidic gum arabic and the sodium silicate produces a slight precipitation of the gelatinous silicic acid, whose nature is such as to increase the plasticity and workability of the plastic and to improve the texturing quality of the same. In addition the use of sodium silicate in the gum arabic size or plastic improves the hardening quality of the same after it has been applied to the surface, and the dehydration of the silicic acid forms a deposit of silica contributing to the hardening process. In practice, I prefer to employ the commercial powdered sodium silicate in the proportion of one part to four parts of the gum arabic used.

In order to provide an improved plastic composition possessing superior texturing properties, I have experienced particularly good results by utilizing a special type of clay having a characteristic flaky appearance when ground up. This type of clay comprises the type known as pyrophyllite clay, and I prefer to employ substantially sixty per cent of this material in the composition together with some ground up asbestos of a sufficiently fine fibrous nature to assist in maintaining the desired plasticity while the flaky characteristics of the pyrophyllite clay serve to impart a particularly attractive appearance to the plastic mass when hardened upon the surface and also to assist in providing the desired texturing properties. By combining this character of inert material with gum arabic as the binder I have been able to produce very desirable plastic material for use in application to walls, ceilings and the like to provide most attractive and durable decorative surfaces for the same.

While the preferred compositions have been above described, it will be understood that the invention is not to be strictly limited thereto, but that its scope is defined by the following claims.

Having thus described the invention what is claimed is:—

1. A coating composition of the character described comprising gum arabic and sodium silicate, the gum arabic being present in a major proportion.

2. A coating composition for use as a plastic in the application to walls, ceilings and the like, comprising gum arabic and a pyrophyllite clay.

3. A coating composition for use as a plastic in the application to walls, ceilings and the like, comprising gum arabic, a pyrophyllite clay and sodium silicate.

4. A coating composition for use as a plastic in the application to walls, ceilings and the like, comprising finely divided inert material of a character capable of imparting texturing qualities to the mass, finely divided gum arabic in sufficient quantity to act as a binder for the texturing material, and a lesser quantity of sodium silicate.

5. A coating composition for use as a plastic in the application to walls, ceilings and the like, comprising finely divided inert material of a character capable of imparting texturing qualities to the mass, finely divided gum arabic in sufficient quantity to act as a binder for the texturing material, and sodium silicate in the proportion of one part to four parts of gum arabic.

In testimony whereof I have signed my name to this specification.

FRANCIS CLARKE ATWOOD.